Dec. 25, 1956   F. N. EATON   2,775,745
BREAKAWAY ELECTRICAL CONNECTOR
Filed June 22, 1955   2 Sheets-Sheet 1

INVENTOR.
FREDERIC N. EATON
BY
ATTORNEYS

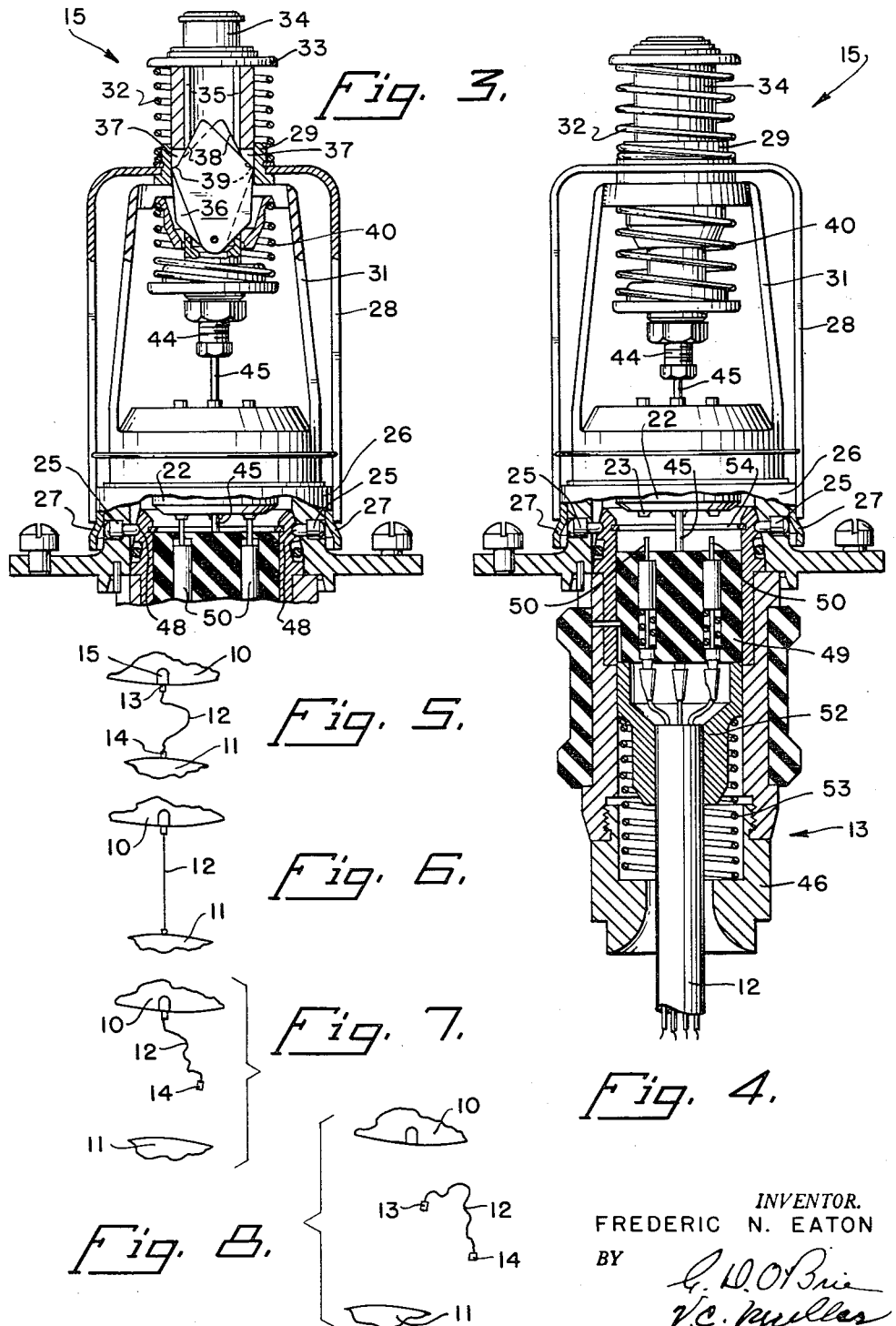

United States Patent Office 2,775,745
Patented Dec. 25, 1956

2,775,745

BREAKAWAY ELECTRICAL CONNECTOR

Frederic N. Eaton, Pasadena, Calif., assignor to the United States of America as represented by the Secretary of the Navy Application June 22, 1955, Serial No. 517,405

5 Claims. (Cl. 339—91)

(Granted under Title 35, U. S. Code (1952), sec. 266)

The invention described herein may be manufactured and used by or for the Government of the United States of America for governmental purposes without the payment of any royalties thereon or therefor.

The present invention relates to electrical connectors and has more particular reference to that class of electrical connectors which are employed to provide a separable electrical connection between an aircraft and an electrical cable for conveying electrical power from a source on the aircraft to a missile or the like carried by and adapted to be dropped or launched from the aircraft.

Many of the modern missiles, or the like, which are transported to the vicinity of a target by an aircraft and then launched or dropped from the aircraft are, prior to the launching or dropping thereof, supplied from a source on the aircraft, with electrical energy for electronic tube warmup or other purposes. Generally, such electrical energy is conveyed to the missile by means of a short cable or jumper which is connected to the missile by a detachable connector which separates upon the application of a given force to the parts of the connector as by the cable being pulled taut upon launching of the missile. In some instances, the aircraft end of the cable was permanently secured to the aircraft with the result that the aircraft suffered frequent damage due to the cable and trailing connector being snapped about in the air stream. Numerous arrangements for overcoming this disadvantage of permanently fixed cables have been proposed, such as electrically actuated or mechanically actuated separable connectors between the cable and the aircraft. These proposed arrangements proved to be unsatisfactory owing to their complexity, cost, and unreliability.

The present invention provides a breakaway electrical connector for releasibility connecting an aircraft-missile electrical cable to the aircraft, which connector is relatively simple in its construction and operation, reliable in use, and which operates to automatically disconnect the cable from the aircraft immediately following detachment of the cable from the missile.

In accordance with the foregoing, an object of the invention is the provision of a breakaway electrical connector.

Another object of the invention is the provision of a breakaway electrical connector wherein the parts, which are normally secured against separation, are automatically conditioned for free separation upon the application and removal of a separating force to the parts.

A further object of the invention is the provision of a breakaway electrical connector for releasibly connecting an electrical cable to an aircraft.

Still a further object of the invention is the provision of a breakaway electrical connector as in the foregoing wherein the parts are normally retained against separation under the action of a force applied to the cable and wherein further the parts are automatically conditioned for free separation upon the release of such force.

Other objects and numerous advantages of the invention will become apparent as the same becomes better understood from the following detailed description had in conjunction with the annexed drawings wherein:

Fig. 3 is a view, partly in section, similar to Fig. 2 showing the mechanism for locking the connector portions together after actuation of such mechanism to the locking position;

Fig. 4 is a view, partly in section, of the present connector with the parts thereof shown as they appear when a strain is placed on the aircraft-missile cable following launching or dropping of the missile; and Figs. 5 through 8 illustrate the sequence in the separation of the aircraft-missile cable from the missile and from the aircraft.

Figure 1:
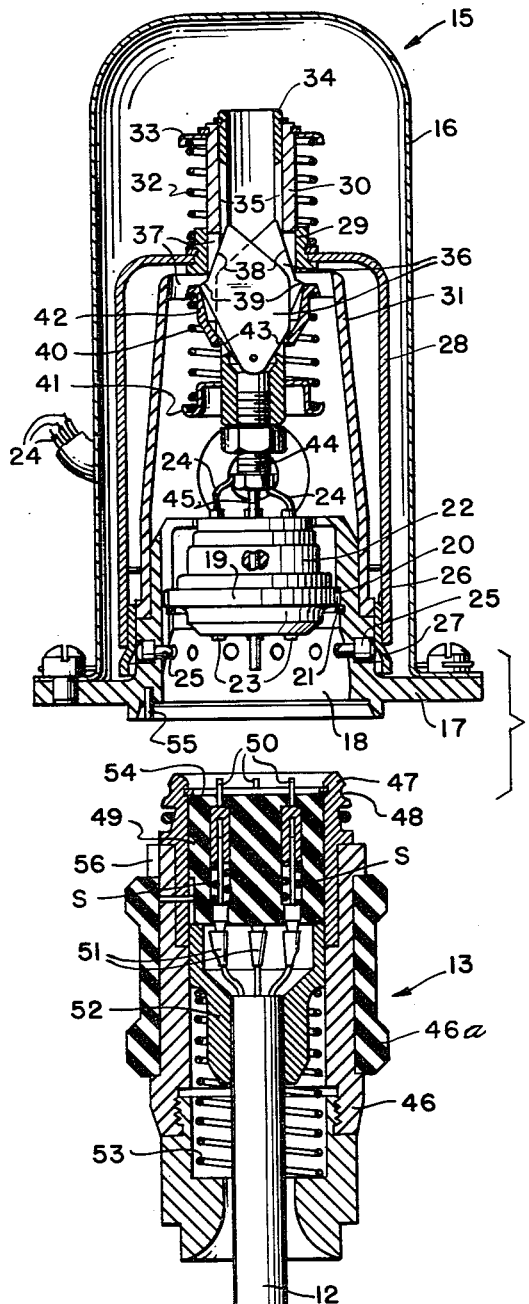
Fig. 1 illustrates in cross-section the parts of the present connector as they appear immediately prior to joining of the male and female portions of the connector.

Referring now to the drawings and more particularly to Figs. 5 thru 8, 10 denotes a portion of the fuselage or wing of an aircraft from which is releasibly supported by any conventional means, not shown, a missile 11 or the like. An electrical cable 12, having plugs 13 and 14 at its opposite ends, serves to convey electrical energy from an electrical power source, not shown, on the aircraft to the missile prior to launching or dropping of the latter from the aircraft. Plug 13 is releasibly secured in a receptacle 15 in the aircraft 10, which plug and receptacle comprise the breakaway electrical connection of this invention, and plug 14 is releasibly received in a socket, or the like, not shown, in the missile. Plug 14 is adapted to be withdrawn from its socket in the missile upon the application of a given strain to the cable 12 to withdraw the plug 14. As shown in Fig. 5, cable 12 is slack while the missile 11 is supported on the aircraft. When the missile has dropped a given distance from the aircraft, following launching of the missile, cable 12 will be strained as shown in Fig. 6, and when the tension in the cable attains a given value, plug 14 will be withdrawn from its socket in the missile, as shown in Fig. 7. As will be more clearly described in the ensuing description, the subsequent removal of the strain from the cable 12, upon withdrawal of the plug 14 from its socket, results in the release of the mechanism locking plug 13 in receptacle 15 whereby to permit cable 12 and plugs 13 and 14 to fall free of the aircraft, as shown in Fig. 8.

Referring now to Fig. 1, the plug 13 and receptacle 15 are shown in their separated condition. Receptacle 15 comprises a hollow, cup-shaped housing 16 which is adapted to be received in a recess formed in, and secured to, the fuselage or wing of the aircraft 10, or the walls of the housing may be formed by the skin of the aircraft. Housing 16 has been omitted from Figs. 2, 3, and 4 for the sake of clarity. Fixed to and closing the open end of housing 16 is a flanged member 17 formed with a socket 18 of the shape illustrated, which socket, as will be seen, is adapted to receive the free end portion of plug 13. Fixed in, and coaxially of socket 18, as by having a shoulder 19 held in abutting relation to an annular ledge 20 by a split ring 21, or the like, is an electrical connector element 22. Element 22 is provided with a plurality of circumferentially arranged contacts 23 against which prongs abut, to be later described, on the plug 13. Contacts 23 are electrically connected through leads 24 to a source of electrical power, not shown, on the aircraft.

Slidably disposed in a series of circumferentially arranged openings extending radially through the wall of socket 18 are a plurality of shouldered detent members 25, which in their extended positions, project into socket 18, as shown. Detents 25 are adapted to be cammed inwardly to their extended position by means of a sleeve 26 axially slidable on the exterior wall of socket 18 and formed with a bevelled camming portion 27 engaging the outer ends of detents 25. Camming sleeve 26 is fixed, in any suitable manner, to the open end of a generally U-shaped member 28, provided at its bight portion with an axial opening in which is fixed a flanged bearing member 29. Bearing member 29 is axially slidable on the exterior of a reduced diameter extension 30 formed on one end of a generally U-shaped member 31 fixed at its lower end to the exterior wall of socket 18. A spring 32, abutting at one end the bearing 29 and at the other end a collar 33 fixed to the free end of extension 30, serves to bias member 28 downwardly, as viewed in Fig. 1, and therefore forcing sleeve member 26 to a position whereat detents 25 are cammed inwardly to their extended positions.

Axially slidable in a bore formed in extension 30 is a hollow shaft 34 which has an intermediate portion of its wall slotted at diametrically opposite positions as shown at 35. Pivotally secured within shaft 34 are a pair of latch plates 36 which project through slots 35. The end of member 31 and a portion of extension 30 are slotted, as shown at 37 to accommodate outward pivotal movement of plates 36. Plates 36 are each formed with an inclined cam portion 38 and a latching ledge portion 39 for purposes hereinafter described. A spring 40, abutting at one end a collar 41 fixed to shaft 34 and at the other end a cup-shaped element 42 slidable on shaft 34 and abutting the end of member 31, serves to bias shaft 34 downwardly as viewed in Fig. 1. The wall of the opening through the lower end of cup member 42 and through which shaft 14 slidably extends acts as a cam adapted to engage inclined edge surface 43 on latch plates 36 for camming the latter to their radially extended position shown when shaft 34 is urged to its lower position, illustrated, under the action of spring 40. Axially threaded in the lower end of shaft 34 is a screw 44 having thereon a lock nut as shown and formed with an axial actuating rod 45 which extends slidably through electrical connector element 22 and which, in the lower position of shaft 34, projects beyond the lower end of element 22.

Plug 13 comprises a hollow, generally cylindrical shell 46 in one end of which is fixed a hollow, generally cylindrical insert 47 the exterior surface on the outer end portion of which conforms substantially to the shape of, and is adapted in the joined condition of the connector parts to be disposed in, socket 28. Insert 47 has formed in its outer surface a circumferential groove 48 into which the detents 25 are adapted to extend in the locked condition of the connector parts. Slidably disposed within extension 47 is an electrical connector element 49 of electrically insulating material having slidably disposed therein a plurality of circumferentially arranged prong members 50 equal in number to and arranged to abut contacts 23 in receptacle connector element 22. Prong members 49 are urged to their extended positions under the action of springs S as shown and electrically connected by leads 51 to aircraft-missile cable 12. The outer sheath of cable 12 is frictionally held in an axial opening formed in a generally bell-shaped plunger 52 which is held in abutting relation to element 49 by a spring 53 which serves to bias member 52 and element 49 upwardly, as viewed in Fig. 1. A split ring 54 acts to limit such upward movement. An electrically insulating sleeve member 46a may be disposed about shell 46 if desired.

Figure 2:
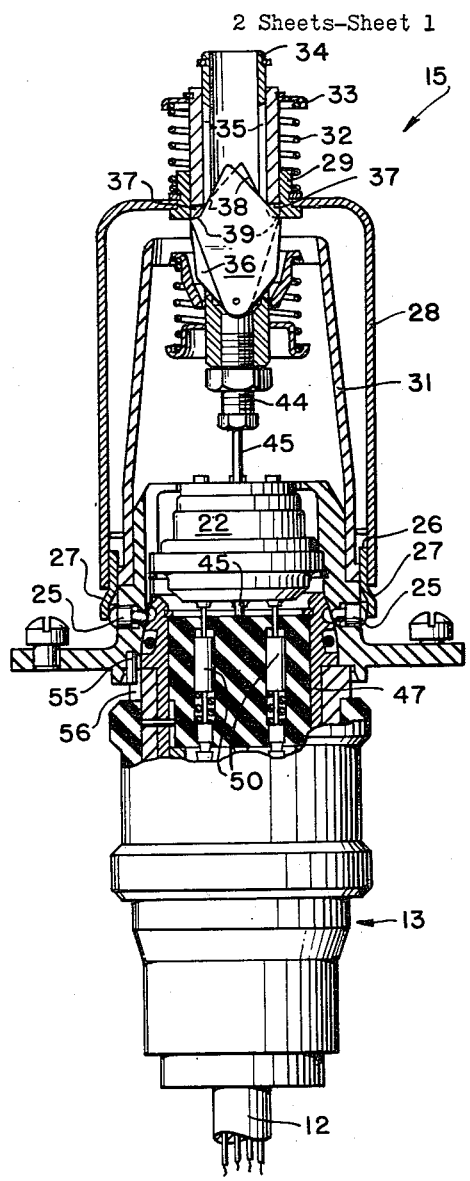
Fig. 2 illustrates in cross-section the parts of the present connector as they appear following insertion of the male portion of the connector into the female portion, the mechanism for locking the portions together being in its retracted position.

Operation of the present breakaway connector is as follows: Prior to insertion of plug 13 into receptacle 15, the parts of the connector appear as shown in Fig. 1. To effect joinder of the plug and receptacle, member 47 is inserted into socket 18 as shown in Fig. 2 with prongs 50 abutting contacts 23 in the receptacle. Engagement of a pin 55 in slot 56 assures proper mating of the prongs and contacts. Insertion of the plug into the socket 18 results in the engagement of the end of rod 45 with plug connector element 49 and subsequent lifting of rod 45 and shaft 34 to the position shown in Fig. 2. Lifting of shaft 34 effects raising of member 28, and therefore cam sleeve 26, through the engagement of latching shoulder portions 39 of latching plates 36 with bearing member 29 (see Fig. 1), said plates having been pivoted to the radially extended positions of Fig. 1 by engagement of cup member 42 with inclined edges 43 on the plates 36, as heretofore described. Raising of cam sleeve 26 to its upper position, shown in Fig. 2, enables the detents 25 to be cammed to their retracted positions by the inclined outer surface on the plug insert 47 whereby to permit the plug to be fully seated in the socket 18. Screw 44 is so adjusted that where the plug is completely seated in the socket, shaft 34 will have been raised to the position of Fig. 2 whereat, owing to the camming action of the upper end walls of slots 37 in extension 30 on the inclined edge surfaces 38 of latch plates 36, the later will be cammed radially inwardly, as shown, whereby to move the latching edge portions or shoulders 39 out of engagement with bearing 29 and permit member 28 and cam sleeve 26 to be moved to their lower position, as illustrated in Fig. 3, under the action of spring 32. Downward movement of cam sleeve 26 causes the annular inclined portion 27 thereof to cam detents 25 to their extended position into groove 48, as shown in Fig. 3, whereby plug 13 will be locked within socket 48.

Upon launching or dropping of the missile 11, or the like from the aircraft, the cable 12 will, upon the missile falling a given distance from the aircraft, be tensioned. When the cable tension attains a given value, plug 14 will be withdrawn from its socket in the missile, as shown in Fig. 7. Simultaneously, the tension in cable 12 will cause downward movement of member 52 and connector element 49, in plug 13, thereby compressing spring 53 and causing separation of prongs 50 from contacts 23 in the receptacle. Downward movement of connector element 49 permits spring 40 to urge shaft 34 to its lower position with a resultant outward camming of latch plates 36 by the member 42, in the manner previously described. While such tension exists in cable 12, that is just prior to withdrawal of plug 14 from the missile socket, the parts of the connector will be positioned as illustrated in Fig. 4. Upon the withdrawal of plug 14, cable tension will be removed whereupon spring 53 will return member 52 and connector element 49 in plug 13 to their upper or normal positions as viewed in Figs. 1, 2, and 3, the constant of spring 43 being of such a value relative to the constant of spring 40 as enable this function to be accomplished. Such upward movement of element 49 results in lifting of pin 45, shaft 34, and therefore cam sleeve 26, through the action of latch plates 36 as previously described. The bias of prongs 50 by springs S will cause sufficient movement of plug 13 to effect camming of detents 25 to their retracted positions by contact between the upper side of groove 48 and the inner ends of the detents, since the detents are now free to move to such retracted positions.

Cable 12 and plugs 13 and 14 will now drop free of the aircraft as shown in Fig. 8. Shaft 34 will be returned to its lower position by spring 40.

Obviously many modifications and variations of the present invention are possible in the light of the above teachings. It is therefore to be understood that within the scope of the appended claims the invention may be practiced otherwise than as specifically described.

I claim:

1. A breakaway electrical connector comprising separable male and female parts, detent means carried by one of said parts and selectively movable to a retracted position wherein said parts are freely separable and to an extended position in engagement in a recess in the other of said parts whereby said parts will be secured against separation, means movably carried by said one part for normally retaining said detent means in the extended position and including a member engageable with the other part upon assembly of the parts, movement of the parts into assembled condition causing movement of the second mentioned means in a manner to release said detent means for free movement of the latter to the retracted position until said recess is approximately aligned with said detent means, a portion of said second mentioned means being operative upon alignment of the recess and detent means to return to its normal position whereby to cause movement of said detent means to the extended position and locking of said parts against separation, said portion of the second mentioned means comprising cam means engageable with said detent means, a shaft movably supported on said one part, said member being moved from a first position to a second position during said movement of the parts into assembled condition, latch means pivotally supported on said shaft and in an extended position engaging said cam means for causing movement of said cam means to its detent releasing position upon movement of said member from its first position to its second position, means for pivoting said latch means to a retracted position for causing disengagement of said latch means with the cam means upon said member reaching its second position, and spring means for biasing said cam means to its normal position.

2. The arrangement according to claim 1 and spring means for biasing said member to its first position, and means for pivoting said latch means to the extended position upon said member being biased to its first position.

3. The arrangement according to claim 1 wherein said other part comprises a body portion, an element carried by said body portion and movable to an extended position and a retracted position, spring means for biasing said element to its extended position, said member engaging said element upon movement of the parts to the assembled condition, the arrangement being such that separation of said parts may be effected by movement of said element to its retracted position and subsequent return of said element to its extended position under the action of said spring means whereby to cause the second mentioned means to move to its detent releasing position and thereby permit separation of the parts.

4. In an electrical jumper cable disposed between an aircraft and a dropable missile carried by same, and wherein the lower end of the cable is disconnectible from the missile when the latter is dropped from the aircraft and the cable becomes taut, the improvements comprising; resilient means for storing energy operable in response to tightening of the cable while its lower end is disconnecting from the missile, means for releasing said energy after the lower end of the cable is disconnected from the missile, and means for automatically disconnecting the upper end of the cable from the aircraft in response to release of said energy, whereby said cable bodily separates from the missile and aircraft.

5. In an electrical jumper device disposed between an aircraft and a dropable missile carried by same, and wherein the lower end of the cable is disconnectible from the missile when the latter is dropped from the aircraft and the cable becomes taut, the improvements, in combination, comprising; means for automatically disconnecting the upper end of the cable from the aircraft upon dropping the missile therefrom, operable in response to storage of energy in said device effected by tightening of the cable while its lower end is disconnecting from the missile, the release of said energy after its lower end is disconnected from the missile effecting disconnection of the device from the aircraft, said device including a female member adapted to be affixed to an aircraft, the female member having a downwardly open recess at its lower end, a plurality of angularly spaced detents disposed around said recess, a detent actuator including a collar portion slideably carried by the female member for movement between a lower limit position and an upper position and having a tapered bore adapted to engage the detents and cam same inwardly when it moves to its lower position, the detents being free to move outwardly when the collar portion is out of engagement with the detents, a plunger slideably carried by the female member for upward movement from a lower limit position, a plunger spring for urging the plunger toward its lower position, a sear carried by the plunger adapted to engage the detent actuator and carry it upwardly when the plunger moves upwardly from its lower position, the sear adapted to be actuated and released from the detent actuator when the plunger moves to a predetermined distance away from its lower position, to thereby release the detent actuator for return to its lower position, a male member having an upper portion adapted to be inserted in said recess and having a peripheral locking groove into which the inner ends of the detents are adapted to be disposed when the detent actuator is at its lower position, thereby locking the male and female members together, a slideable member carried in the male member for downward movement from an upper limit position, a spring for urging the slideable member toward its upper position, the upper end of said cable being affixed to the slideable member and adapted to move it downwardly when the cable is tensioned sufficient to overcome the urge of said spring, electrical contacts carried by the female member adapted to contact with contacts carried by the male member when the male and female members are locked together, and a rod interposed between the slideable member and plunger, the construction and arrangement being such that when the upper end of the male member is inserted in said recess the rod moves the plunger and detent actuator upwardly to thereby release the detents for outward movement, whereby said actuator groove may be disposed in alignment with the detents, continued upward movement effecting release of the sear and permitting the detent actuator to return to its lower position to thereby cam the detents into their locking position in said groove, said tensioning of the cable moving the slideable member downwardly and permitting the plunger to return to its lower position and effect reengagement of its sear with the detent actuator, release of tension in the cable effecting upward movement of the slideable member, the rod, and the plunger to thereby move the detent actuator upwardly to a position wherein the detents disengage from the groove and permit the cable and male member to fall from the female member.

References Cited in the file of this patent

UNITED STATES PATENTS 2,158,385   Schwein _____ May 16, 1939
2,710,384   Dupre _____ June 7, 1955

OTHER REFERENCES

Tele-Tech, May 1954, pages 70 and 71.